US005564083A

United States Patent [19]

Lee et al.

[11] Patent Number: 5,564,083

[45] Date of Patent: Oct. 8, 1996

[54] ANTENNA ELEMENT MOUNTING IN A RADIO

[75] Inventors: John K. M. Lee, Ramona, Calif.; Akihiko Inoue, Soma, Japan

[73] Assignee: QUALCOMM Incorporated, San Diego, Calif.

[21] Appl. No.: 550,419

[22] Filed: Oct. 30, 1995

Related U.S. Application Data

[63] Continuation of Ser. No. 236,844, May 2, 1994, abandoned.

[51] Int. Cl.[6] ................................ H04B 1/40; H01Q 1/24

[52] U.S. Cl. ............................ 455/90; 455/128; 455/129; 455/300; 455/351

[58] Field of Search ................................ 455/89, 90, 129, 455/128, 269, 300, 301, 347, 351, 82; 379/428, 429, 58, 433, 434; 343/702; H01Q 1/24

[56] References Cited

U.S. PATENT DOCUMENTS

| | | | |
|---|---|---|---|
| 4,641,366 | 2/1987 | Yokoyama et al. | 455/89 |
| 5,200,997 | 4/1993 | Léman | 455/90 |
| 5,392,461 | 2/1995 | Yokoyama | 455/89 |

FOREIGN PATENT DOCUMENTS

| | | | |
|---|---|---|---|
| 0288627 | 12/1986 | Japan | 455/90 |
| 0175824 | 7/1991 | Japan | 455/90 |
| 0206736 | 9/1991 | Japan | 455/89 |
| 0260957 | 9/1994 | Japan | 455/90 |

*Primary Examiner*—Reinhard J. Eisenzopf
*Assistant Examiner*—Nguyen Vo
*Attorney, Agent, or Firm*—Russell B. Miller; Roger W. Martin

[57] ABSTRACT

The antenna element mounting of the present invention enables an antenna to be mounted between the printed circuit boards of a radio instead of along side the boards. The shielding of the printed circuit boards has an indentation along one edge of each shield. When the shields are mated, the indentations form a channel into which the antenna is mounted.

8 Claims, 2 Drawing Sheets

-PRIOR ART-

ANTENNA ELEMENT MOUNTING IN A RADIO

This is a continuation of application Ser. No. 08/236,844, filed May 2, 1994, now abandoned.

BACKGROUND OF THE INVENTION

I. Field of the Invention

The present invention relates to a radio communication device. More particularly, the present invention relates to an antenna element mount.

II. Description of the Related Art

As manufacturers reduce the size of wireless communication devices, new locations in the device must be found to mount items. FIG. 1 illustrates a typical radio. This radio, like most, requires a movable antenna element (101) mounted in the case (102) that extends up through the case (102). This antenna (101) can be fixed in length or telescoping, thus allowing the length to be adjusted by the user.

Most radios also require shielding (105 and 108) around printed circuit boards (110 and 115) or substrates to prevent radio frequency emissions from escaping the radio or certain portions of the radio. These RF emissions can affect other circuits within the radio or interfere with circuits outside the radio. The shields (105 and 108), however, make it difficult to reduce the size of radios since they require a relatively large amount of volume and must also be sealed off from the rest of the radio to shield effectively. This precludes mounting an antenna through the shield in order to move the antenna from the location shown in FIG. 1 to reduce the width of the radio. There is a resulting need for a way to mount an antenna in a radio or radiotelephone that reduces the volume needed while maintaining any shielding integrity.

SUMMARY OF THE INVENTION

The radio housing of the present invention encompasses a first and second printed circuit board within the housing. Both the first and second printed circuit boards have shielding surrounding most circuitry on the boards. The shielding on each board has an indentation on at least one side. The shields are coupled together such that the indentations from each shield are coupled to form a channel running substantially parallel to the length of the printed circuit boards. The antenna element is mounted within the channel.

DETAILED DESCRIPTION OF THE PREFERRED EMBODIMENT

Figure 1:
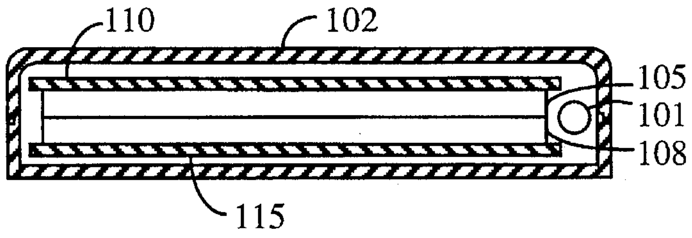
FIG. 1 shows a cross section of a typical prior art radio with an antenna element.
Figure 2:
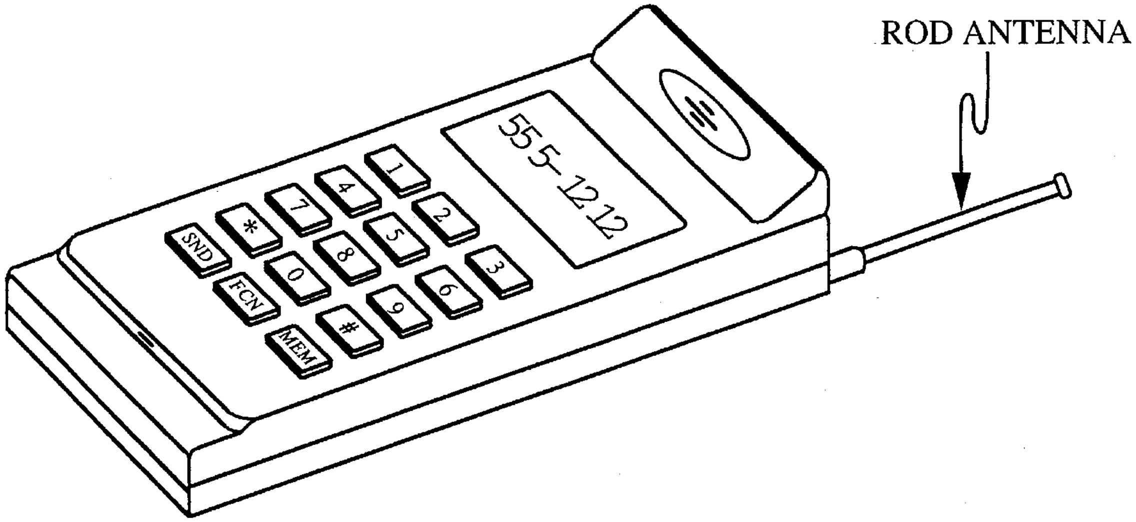
FIG. 2 shows a perspective view of the radiotelephone of the present invention.
Figure 3:
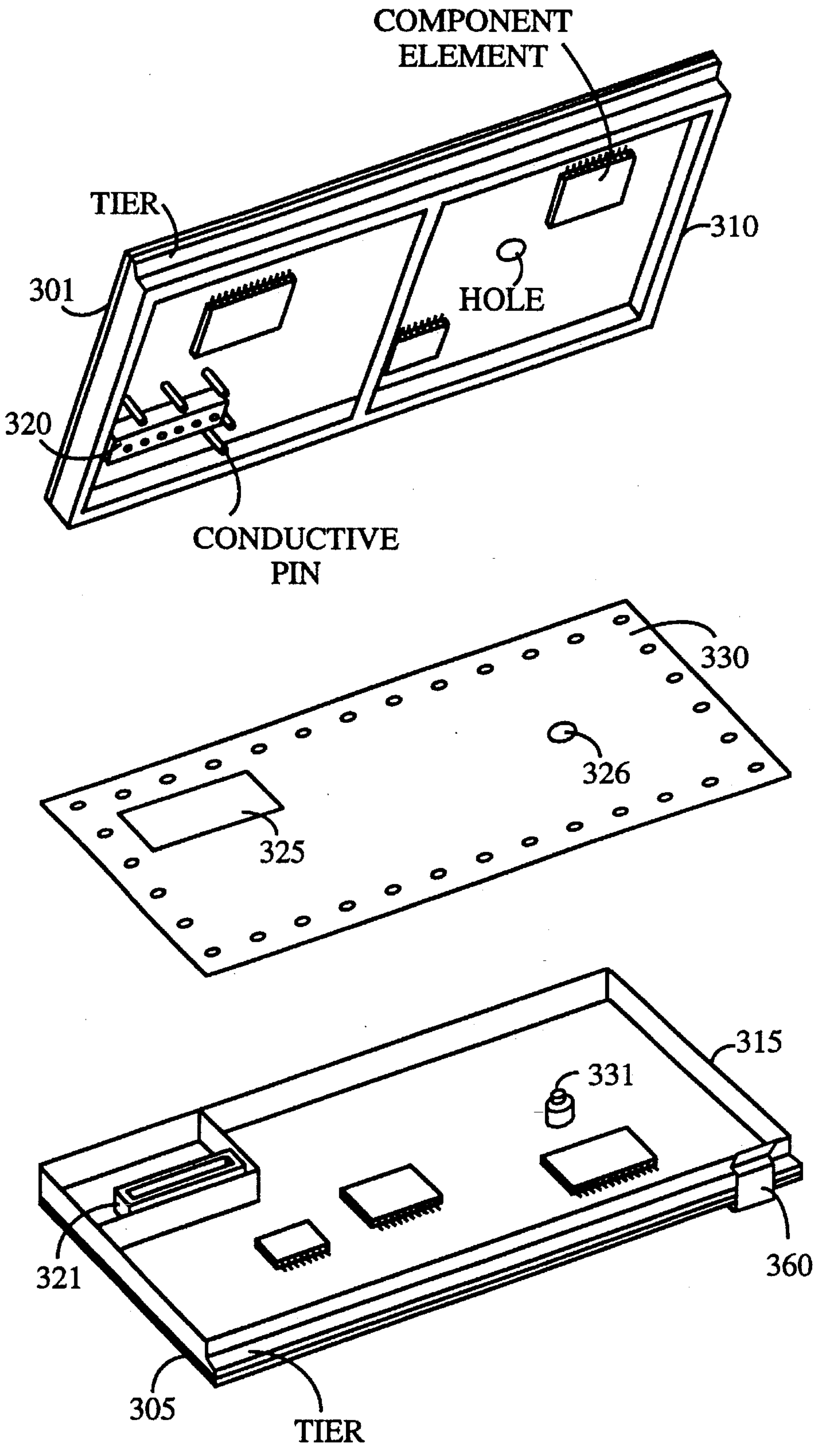
FIG. 3 shows the internal printed circuit boards of the radiotelephone of the present invention.

The radio device of the present invention, in the preferred embodiment, is a radiotelephone capable of operating in a cellular radiotelephone environment. The radiotelephone is illustrated in FIG. 2. In the preferred embodiment, the radiotelephone has two printed circuit boards (301 and 305) as seen in FIG. 3. One of the boards contains digital circuitry (301) and the other contains radio frequency (RF) circuitry (305). The boards (301 and 305) are coupled together by connectors (320 and 321).

The components on both boards (301 and 305) emit signals that could interfere with the other board's circuitry. Shielding (310 and 315), therefore, surrounds the circuitry on both boards (301 and 305). This shielding (310 and 315) is coupled to the radiotelephone's ground potential, thus preventing extraneous emissions from affecting the circuitry on the boards (301 and 305).

A metal shielding cover (330) separates the shielding frames (310 and 315) of the two boards when they are connected by the connectors (320 and 321). The cover (330) closes off the cavities in the shielding (315) of the RF board (305). The shielding cover (330) has holes (325 and 326) in the appropriate locations to allow the connector to penetrate. Also in the preferred embodiment, a support (331) on the RF board (305) goes through the shielding cover (330) and through the digital board (301) to help mechanically support the two boards (301 and 305) when they are mated to the radiotelephone housing. In an alternate embodiment, the shielding cover (330) is made of plastic with a metalized, conductive coating.

Figure 4:
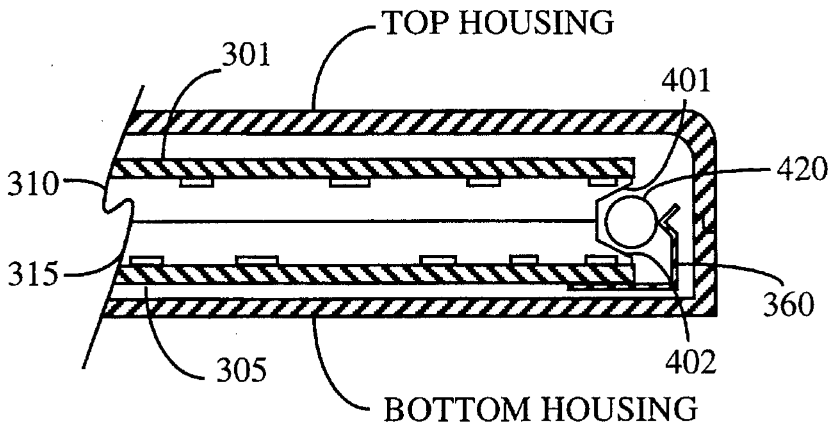
FIG. 4 shows a cross section of the radiotelephone showing the mounting of the antenna element in relation to the shielding in accordance with the present invention.

In order to decrease the width of the radiotelephone housing, the antenna element is mounted in a channel formed in the shields. FIG. 4 illustrates a cross section of the radiotelephone with the two boards (301 and 305) and their respective shielding (310 and 315). Each shield has an indentation or tier (401 and 402) on one side of the shield. The indentation of each shield (401 and 402) is matched up with the other when the two boards (301 and 305) are mated together with the connectors. The two indentations together form the channel that runs the length of the boards (301 and 305). In an alternate embodiment, the channel runs only a portion of the length of the boards.

The antenna element (420) is coupled to the RF board (305) by a conductive contact (360), as seen in FIGS. 3 and 4. The contact (360) couples the antenna (420) to the RF circuitry. Thus, signals that are received by the antenna (420) can be conducted to the receive portion of the radiotelephone and signals to be transmitted are conducted from the transmit amplifiers to the antenna (420) for radiation.

In the preferred embodiment, the antenna is mounted directly to the antenna contact (360). Alternate embodiments mount the antenna on the radiotelephone housing in the channel and the contact (360) couples the antenna element to the board.

The radio of the present invention provides an antenna mounting scheme that enables an antenna element to be mounted between circuit boards of the radiotelephone. This enables the width of the radiotelephone to be reduced, thus making a smaller radiotelephone possible. The present invention also allows parts to be mounted under the tiers of each board so that valuable board real estate is not lost to the antenna.

We claim:

1. A radio housing having an elongated antenna element, a first substrate, and a second substrate, the radio housing comprising:

a first frame structure coupled to the first substrate, the first frame structure having an indentation on an elongated first side; and a second frame structure coupled to the second substrate, the second frame structure having an indentation on an elongated first side, the second frame structure coupled to the first frame structure such that the elongated first side of the first frame structure is substantially parallel to the elongated first side of the second frame structure and the indentation of the first frame structure is coupled to the indentation of the second frame structure to form an elongated channel, the elongated antenna element being mounted substantially in the elongated channel and substantially between the first substrate and the second substrate.

2. The radio housing of claim 1 wherein the first and second frame structures are comprised of an electrically conductive material.

3. The radio housing of claim 1 wherein the first and second frame structures are coated with an electrically conductive material.

4. The radio housing of claim 1 and further including a conductive material coupling the antenna element to the second substrate.

5. The radio housing of claim 1 wherein said first and second substrates each have at least one electrical component disposed on an outer surface, said at least one electrical component of said first substrate disposed substantially between said first substrate and said elongated indentation of said first frame structure and said at least one electrical component of said second substrate disposed substantially between said second substrate and said elongated indentation of said second frame structure.

6. A radiotelephone housing having an elongated antenna element that extends substantially the length of the radiotelephone housing, a first printed circuit board, and a second printed circuit board, the elongated antenna element being electrically coupled to the second printed circuit board, the radio housing comprising:

a first frame structure coupled to the first printed circuit board, the first frame structure being electrically conductive and performing a shielding function for the first printed circuit board, the first frame structure having an elongated indentation on a first side; and a second frame structure coupled to the second printed circuit board, the second frame structure being electrically conductive and performing a shielding function for the second printed circuit board, the second frame structure having an elongated indentation on a first side, the second frame structure coupled to the first frame structure such that the first side of the first frame structure is substantially parallel to the first side of the second frame structure and the indentation of the first frame structure is coupled to the indentation of the second frame structure to form an elongated channel extending substantially the length of the first and second printed circuit boards, the elongated antenna element being mounted in the channel and substantially between the first and second printed circuit boards.

7. The radio housing of claim 6 wherein said first and second printed circuit boards each have at least one electrical component disposed on an outer surface, said at least one electrical component of said first printed circuit board disposed substantially between said first printed circuit board and said elongated indentation of said first frame structure and said at least one electrical component of said second printed circuit board disposed substantially between said second printed circuit board and said elongated indentation of said second frame structure.

8. A radiotelephone housing having an elongated antenna element that extends substantially the length of the radiotelephone housing, a first printed circuit board having at least one electrical component disposed on a first outer surface, and a second printed circuit board having at least one electrical component disposed on a first outer surface, the elongated antenna element being electrically coupled to the second printed circuit board, the radio housing comprising:

a first frame structure coupled to the first outer surface of said first printed circuit board such that said first frame structure covers said at least one electrical component of said first printed circuit board, the first frame structure being electrically conductive and performing a shielding function for the first printed circuit board, the first frame structure having an elongated indentation on a first side, the at least one electrical component of the first printed circuit board being disposed substantially between the first printed circuit board and the elongated indentation of the first frame structure; and a second frame structure coupled to the first outer surface of said second printed circuit board such that said second frame structure covers said at least one electrical component of said second printed circuit board, the second frame structure being electrically conductive and performing a shielding function for the second printed circuit board, the second frame structure having an elongated indentation on a first side, the at least one electrical component of the second printed circuit board being disposed substantially between the second printed circuit board and the elongated indentation of the second frame structure, the second frame structure coupled to the first frame structure such that the first side of the first frame structure is substantially parallel to the first side of the second frame structure, and the first outer surface of the first printed circuit board is facing the first outer surface of the second printed circuit board, and the indentation of the first frame structure is coupled to the indentation of the second frame structure to form an elongated channel extending substantially the length of the first and second printed circuit boards, the elongated antenna element being mounted in the channel and substantially between the first and second printed circuit boards.

* * * * *